United States Patent [19]

Hayakawa et al.

[11] Patent Number: 4,726,407
[45] Date of Patent: Feb. 23, 1988

[54] PNEUMATIC RADIAL TIRE TREAD FOR HIGH-SPEED RUNNING VEHICLES

[75] Inventors: Toshio Hayakawa; Toru Tsuda, both of Higashimurayama; Masahiro Takayama, Musashino; Masato Hiruma, Kodaira, all of Japan

[73] Assignee: Bridgestone Corporation, Tokyo, Japan

[21] Appl. No.: 25,031

[22] Filed: Mar. 12, 1987

[30] Foreign Application Priority Data

Mar. 14, 1986 [JP] Japan .................................. 61-54962

[51] Int. Cl.$^4$ ............................................. B60C 11/03
[52] U.S. Cl. ................................. 152/209 R; 152/454
[58] Field of Search ........... 152/209 R, 209 B, 209 D, 152/454

[56] References Cited

U.S. PATENT DOCUMENTS

| | | | | |
|---|---|---|---|---|
| 2,821,231 | 1/1958 | Kraft | .................... | 152/209 R |
| 3,030,999 | 4/1962 | Wolfer | .................... | 152/209 R |
| 4,057,089 | 11/1977 | Johannsen | ............. | 152/209 R |
| 4,353,402 | 10/1982 | Burche et al. | ......... | 152/209 R |
| 4,606,389 | 8/1986 | Haas | .................... | 152/209 R |
| 4,667,717 | 5/1987 | Grass | .................... | 152/209 D |

FOREIGN PATENT DOCUMENTS 0090702  7/1981  Japan .................. 152/209 D

Primary Examiner—Michael Ball
Attorney, Agent, or Firm—Sughrue, Mion, Zinn, Macpeak, and Seas

[57] ABSTRACT

A pneumatic radial tire for high-speed running vehicles has a directional tread pattern defined by one or two relatively wide circumferential grooves arranged in the central region and plural slant grooves arranged in each side region of the tread, and an aspect ratio of not more than 0.8. In this tire, the slant grooves are arranged in a herringbone form with respect to the equator without communicating with the circumferential groove, each of which extending from an initial end to a terminal end and being a folded line at a folding point corresponding to 0.3–0.45 times of the tread width that an inclination angle $\alpha$ of line segment inward from the folding point is 40°–85° with respect to the meridian of the tire and an inclination angle $\beta$ of line segment outward from the folding point is smaller than the inclination angle $\alpha$ and 0°–50° with respect to the meridian of the tire.

5 Claims, 2 Drawing Figures

FIG_1
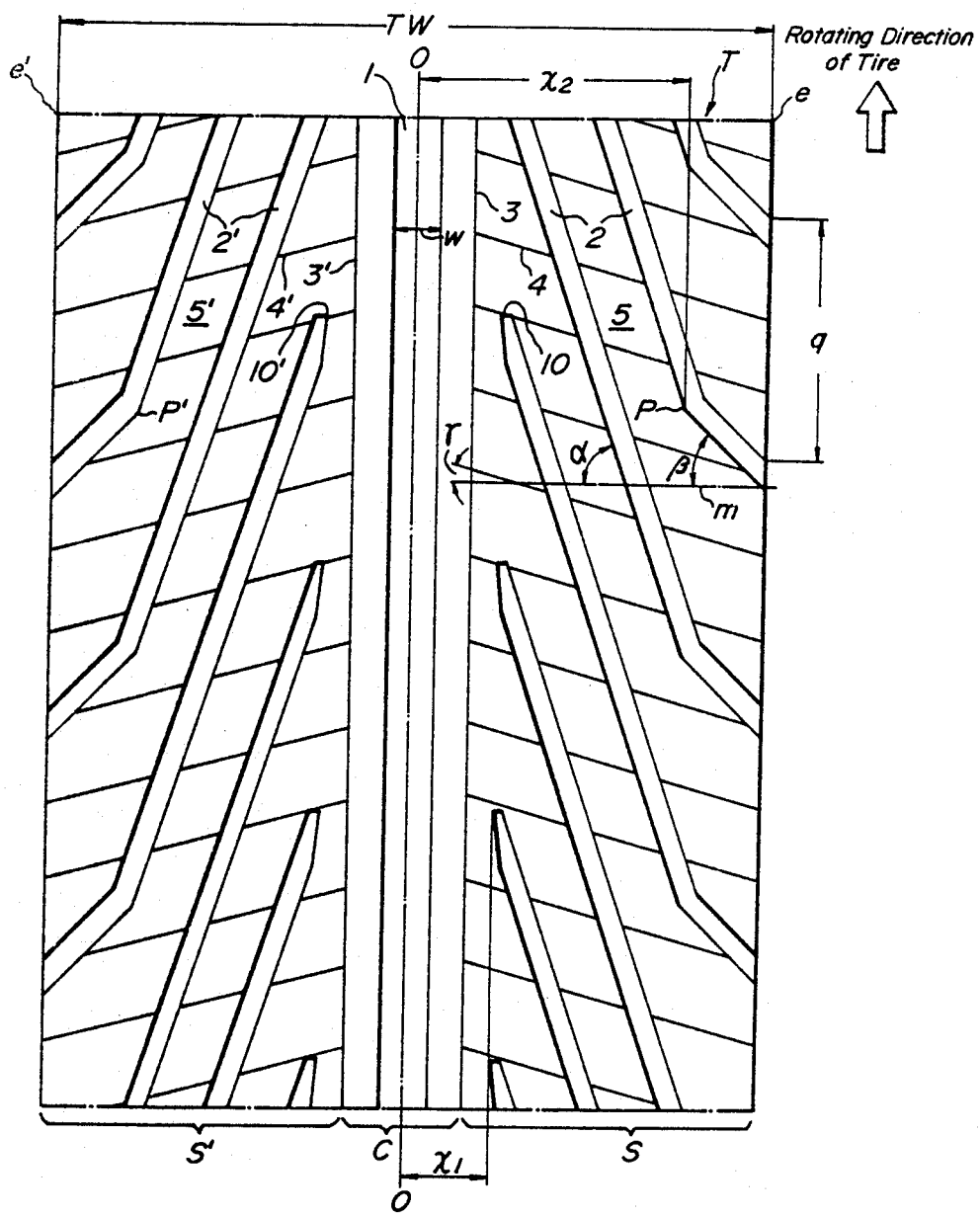

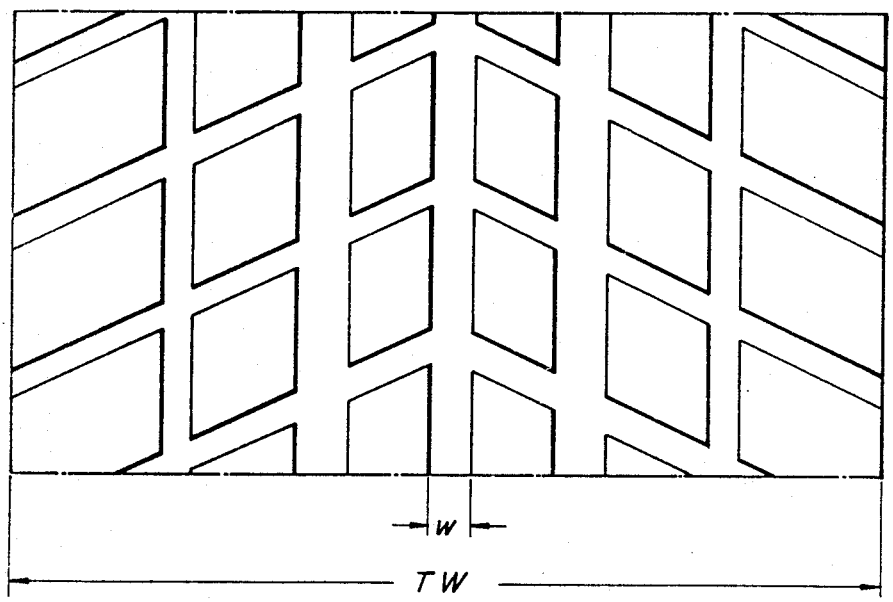
FIG_2
PRIOR ART

PNEUMATIC RADIAL TIRE TREAD FOR HIGH-SPEED RUNNING VEHICLES

BACKGROUND OF THE INVENTION

1. Field of the Invention

This invention relates to a pneumatic radial tire, and more particularly to a so-called low section pneumatic radial tire having a ratio of tire section height to maximum tire width or an aspect ratio of not more than 0.8.

2. Related Art Statement

Since tread width is relatively wide in this type of the tire, the drainage property that is performance of removing a water layer covering a running road surface from a ground contact area of the tire during the raining is particularly important in order to avoid a dangerous phenomenon such as hydroplaning, aquaplaning or floating when the tire is used on expressways and so on. Therefore, the improvement of tread patterns advantageously satisfying the above requirement is an urgent matter in order to ensure the steering stability of the vehicle under such situations that the tendency of high speed running in passenger cars becomes exceedingly strong and the value of aspect ratio becomes considerably small.

In Japanese Patent laid open No. 57-194,106 (corresponding to U.S. patent application Ser. No 262,238) a tire for racing cars is disclosed wherein the drainage performance and the prevention of tread damage are compromisedly improved through a netted tread pattern formed by arranging circumferential grooves and lateral grooves slantingly crossed therewith over the entire area of the tread portion.

On the contrary, in the low section pneumatic tire for a passenger car, it is required to reduce noise resulting from the rotation of the tire running on roads in addition to the drainage performance as mentioned above. In these noise such as pattern noise, road noise and the like, the sound pressure level rises with the increase of the running speed, resulting in the uncomfortable feeling and hence fatigue to a driver during the high speed running. In this connection, it is very difficult to simultaneously establish the reduction of noises and the drainage performance by the block arrangement based on the above netted tread pattern because the blocks in the netted tread pattern are intermitent on the ground contact area so that clicks are generated at the block end in the treading of the tire and the grooves defining the block cause a column resonance at the ground contact area of the tire.

SUMMARY OF THE INVENTION

It is, therefore, an object of the invention to provide a new tread pattern for a high-speed pneumatic radial tire particularly usable in passenger cars which can attain the enhancement of drainage performance without degrading noise control properties.

According to the invention, there is the provision of in a pneumatic radial tire for high-speed running vehicles having a directional tread pattern defined by arranging one or two relatively wide circumferential grooves in only a central region of a tread (which has a width corresponding to 15-25% of tread width) and plural slant grooves acutely crossing with the meridian of the tire and extending substantially in parallel to each other in a convergent direction toward the equator of the tire in each of side regions of the tread, and a ratio of maximum height of the tire section measured from bead base to maximum tire width of not more than 0.8, the improvement wherein the slant grooves are arranged in a herringbone form with respect to the equator without communicating with the circumferential groove, each of which extending from an initial end separated from the adjoining circumferential groove to a terminal end opening sidewards at each circumferential edge of the tread and being a folded line at a folding point corresponding to 0.3-0.45 times of the tread width as positioned from the equator of the tire that an inclination angle $\alpha$ of line segment inward from the folding point is 40°-85° with respect to the meridian of the tire and an inclination angle $\beta$ of line segment outward from the folding point is smaller than the inclination angle $\alpha$ and 0°-50° with respect to the meridian of the tire.

The term "meridian of the tire" used herein means a contour of tire sectional plane including the rotational axis of the tire, and the term "equator of the tire" means a circumference at a widthwise center of the tread.

When there is one circumferential groove, it extends on the equator at a relatively wide groove width corresponding to about 0.06-0.1 times of the tread width, while when using two circumferential grooves, they are arranged only in the central region of the tread at a groove width corresponding to 0.04-0.08 times of the tread width so as to sandwich the equator therebetween.

The slant groove has a groove width corresponding to about 0.015-0.065 times of the tread width, which is always narrower than the groove width in total of the circumferential groove or grooves.

Moreover, it is desirable that plural sipes crossing with the slant grooves are arranged in each side region of the tread in parallel to each other and define blocks together with the slant grooves. Each of these sipes has a width of not more than 1.5 mm, preferably not more than 0.8 mm and a depth somewhat shallower than that of the slant groove. Thus, the opposing walls of the sipe contact with each other of only the ground contact area during the running of the tire under loading.

BRIEF DESCRIPTION OF THE DRAWINGS

The invention will be described with reference to the accompanying drawings, wherein:

FIG. 1 is a developed view of a part of a tread pattern in an embodiment of the pneumatic radial tire according to the invention; and FIG. 2 is a developed view of a part of the conventional tread pattern.

DESCRIPTION OF THE PREFERRED EMBODIMENTS

FIG. 1 illustrates a main developed part of a tread pattern in a tread of a pneumatic radial tire according to the invention.

In FIG. 1, T is a tread, TW is a tread width, e, e' are side edges of the tread T, 0—0 is a center circumference of the tread T or an equator of the tire. Numeral 1 is a wide circumferential groove extending along the equator 0—0 in the illustrated embodiment, numerals 2, 2' are slant grooves extending substantially in parallel to each other at an acute angle with respect to a meridian m of the tire in each of side regions S, S' of the tread T sandwiching a central region C of the tread T inclusive of the circumferential groove 1 therebetween, numerals 3, 3' are circumferential sipes cut along the circumference of the tread T at positions bordering the side regions S, S' to the central region C in the illustrated embodiment, numerals 4, 4' are inclinational sipes cut from the circumferential sipes 3, 3' across the slant grooves 2, 2' toward the tread side edges e, e', and numerals 5, 5' are blocks of island portions in the side regions S, S' of the tread T defined by the slant grooves 2, 2', the circumferential sipes 3, 3' and the inclinational sipes 4, 4'.

Each of the slant grooves 2, 2' extends from an initial end 10, 10' separated from the adjoining groove wall of the circumferential groove 1 toward a terminal end opening sidewards at each tread side edge without communicating with the circumferential groove 1 and is a folded line at each of folding points P, P' between the initial end and the terminal end. In this case, it is preferable that the initial end separates away from the tread center at a distance $x_1$ corresponding to 0.10–0.18 times of the tread width TW, while the folding point P, P' is necessary to separate away from the tread center at a distance $x_2$ corresponding to 0.3–0.45 times of the tread width TW. Moreover, it is required that the inclination angle $\alpha$ of the slant grooves 2, 2' inward from the folding point P, P' is in the range of 40°–85° with respect to the meridian m and the inclination angle $\beta$ outward from the folding point is smaller than the inclination angle $\alpha$ and in the range of 0°–50° with respect to the meridian.

Each of the circumferential sipes 3, 3' locates at substantially a center between the edge of the circumferential groove 1 and the initial end of each of the slant grooves 2, 2'. Furthermore, the inclination angle $\gamma$ of the inclinational sipes 4, 4' is desirable to be within ±45°, preferably in the range of 0°–30° with respect to the meridian m.

As shown in FIG. 1, two or three inclinational sipes may be arranged at approximately equal intervals in a pitch q between the adjoining slant grooves. In the illustrated embodiment, three inclinational sipes are arranged in form of a straight line within the pitch q over the entirely of each of the side regions S, S'. Further, the inclinational sipe may be arranged in a stepwise, wavy or broken form or in a part of the side region.

According to the invention, the reason why one or two circumferential grooves are arranged in only a central region of the tread and the initial end of the slant groove is separated away from the circumferential groove without communicating therewith is based on the fact that it is intended to prevent a lowering the rigidity at an inner end of an island portion defined by the slant grooves. This in turn causes uneven wear or clicks because the inclination angle $\alpha$ is made larger than the inclination angle $\beta$. Further, when the inclination angle $\alpha$ is less than 40°, the drainage performance is insufficient and the effect of reducing the pattern noise is small. While, when exceeds 85°, it is difficult to provide a required traction force. On the other hand, the inclination angle $\beta$ should be within a range of 0°–50° in order to provide a sufficient drainage performance and maintain a required rigidity at the tread end.

When the position $x_2$ of the folding point P, P' is less than 0.3 times of the tread width, the drainage performance and noise reduction are insufficient, while when it exceeds 0.45 times, the rigidity at the tread end considerably lowers.

The invention will be described in detail with respect to the following example.

EXAMPLE

A test tire having a tire size of 205/60 R15 was manufactured according to a tread pattern as shown in FIG. 1, wherein the main structural parts other than the tread pattern were the same as in the conventional tire and the illustration thereof was omitted.

In the tread pattern of FIG. 1, the tread width TW was 170 mm, the groove width w of the circumferential groove 1 was 15.3 mm (0.09 TW). The slant grooves 2, 2' were arranged in such a herringbone form that the inclination angle $\alpha$ ranging from the initial end separated from the equator 0—0 at a distance $x_1$ of 23 mm (0.135 TW) to the folding point P, P' separated from the equator at a distance $x_2$ of 65 mm (0.38 TW) was 70° and the inclination angle $\beta$ extending outward from the folding point P, P' was 40°, and had a groove width of 6 mm (0.035 TW).

All of the grooves 1, 2, 2' had a V-shaped section with a groove depth of 8.0 mm.

Further, the circumferential sipes 3, 3' and inclinational sipes 4, 4' were formed on the test tire of the above structure. In this case, each of these sipes had a depth of 5 mm and a width of 0.8 mm and the inclination angle $\gamma$ of the inclinational sipes 4, 4' was 15°.

For the comparison, there was provided a tire having the same size and a netted tread pattern as shown in FIG. 2.

The drainage performance, wet braking performance, wet slalom performance and pattern noise on dry road surface were measured with respect to these tires to obtain results as shown in the following table.

|  | Test tire | | Conventional tire |
|---|---|---|---|
|  | presence of sipe | absence of sipe | |
| Drainage performance at 60 km/hr | 116 | 112 | 100 |
| Drainage performance at 80 km/hr | 122 | 120 | 100 |
| Drainage performance at 100 km/hr | 216 | 214 | 100 |
| Wet braking performance | 108 | 105 | 100 |
| Wet slalom performance | 106 | 103 | 100 |
| Pattern noise | | | |
| instrumentation | 109 | 110 | 100 |
| feeling | 115 | 118 | 100 |

(Note)
1. In the test tire, the "presence of sipe" means a tire having circumferential sipes 3, 3' and inclinational sipes 4, 4' as shown in FIG. 1, and the "absence of sipe" means a tire having no sipe.
2. The performance is represented by an index on the basis that the conventional tire is 100. The larger the index value, the better the performance.

The test for drainage performance was carried out by running the tire on a wet road surface with a water depth of 5 mm at a speed of 60, 80 or 100 km/hr and then braking it to measure a degree of reducing an actual ground contact area from a ground contact area at stop, from which an ability of preventing the hydroplaning was evaluated.

The wet braking performance was evaluated by a sliding distance after the rapid braking on running at a speed of 80 km/hr in the above test.

The wet slalom performance was evaluated by the passing time when the tire was zigzag run through five pillons on a wet road surface with a water depth of 5 mm over a distance of 90 m.

The pattern noise was measured by a tire noise test method according to JASO C606.

As mentioned above, the pneumatic radial tires for high-speed running vehicles according to the invention can realize sufficient drainage performances under wet and high speed running conditions, which are strongly demanded in passenger cars, together with the reduction of noises.

What is claimed is:

1. In a pneumatic radial tire for high-speed running vehicles having a directional tread pattern defined by arranging one or two relatively wide circumferential grooves in only a central region of a tread and plural slant grooves acutely crossing with the meridian of the tire and extending substantially in parallel to each other in a convergent direction toward the equator of the tire in each of side regions of the tread, and a ratio of maximum height of the tire section measured from bead base to maximum tire width of not more than 0.8, the improvement wherein the slant grooves are arranged in a herringbone form with respect to the equator without communicating with the circumferential groove, each of which extending from an initial end separated from the adjoining circumferential groove to a terminal end opening sidewards at each side edge of the tread and being a folded line at a folding point corresponding to 0.3–0.45 times of the tread width as positioned from the equator of the tire that an inclination angle $\alpha$ of line segment inward from the folding point is 40°–85° with respect to the meridian of the tire and an inclination angle $\beta$ of line segment outward from the folding point is smaller than the inclination angle $\alpha$ and 0°–50° with respect to the meridian of the tire.

2. The pneumatic radial tire according to claim 1, wherein said circumferential groove is a groove with a groove width corresponding to 0.06–0.1 times of the tread width.

3. The pneumatic radial tire according to claim 1, wherein said circumferential groove is two grooves each having a groove width corresponding to 0.04–0.08 times of the tread width.

4. The pneumatic radial tire according to claim 1, wherein said slant groove has a groove width corresponding to 0.015–0.065 times of the tread width.

5. The pneumatic radial tire according to claim 1, wherein each of said side regions of the tread including said slant grooves is provided with plural sipes each crossing with the slant grooves at an inclination angle $\gamma$ smaller than said inclination angles $\alpha$ and $\beta$ and arranged in parallel to each other.

* * * * *